United States Patent
Balasubramanian et al.

(10) Patent No.: US 9,960,997 B2
(45) Date of Patent: May 1, 2018

(54) METHOD AND SYSTEM FOR DATA AGGREGATION IN AN INDUSTRIAL COMMUNICATION PROTOCOL

(71) Applicant: Rockwell Automation Technologies, Inc., Mayfield Heights, OH (US)

(72) Inventors: Sivaram Balasubramanian, Solon, OH (US); Jonathan D. Bradford, Harpersfield, OH (US); Anthony G. Gibart, New Berlin, WI (US); Kenwood H. Hall, Hudson, OH (US); Kendal R. Harris, Mentor, OH (US); Raymond R. Husted, Middlefield, OH (US); Edward C. Korsberg, Solon, OH (US); Gregory A. Majcher, Broadview Heights, OH (US); Scott A. Pierce, Concord Township, OH (US); Gregg M. Sichner, Mentor, OH (US); Patrick D. Telljohann, Solon, OH (US); Robert J. Kretschmann, Bay Village, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 92 days.

(21) Appl. No.: 15/084,661

(22) Filed: Mar. 30, 2016

(65) Prior Publication Data
US 2016/0294692 A1 Oct. 6, 2016

Related U.S. Application Data

(60) Provisional application No. 62/140,149, filed on Mar. 30, 2015.

(51) Int. Cl.
*H04J 3/00* (2006.01)
*H04L 12/741* (2013.01)
(Continued)

(52) U.S. Cl.
CPC ........ *H04L 45/74* (2013.01); *G05B 19/41855* (2013.01); *H04L 12/407* (2013.01);
(Continued)

(58) Field of Classification Search
CPC ..... H04L 45/74; H04L 12/437; H04L 12/417; H04L 12/407; G05B 19/41855; G05B 2219/31346
See application file for complete search history.

(56) References Cited

U.S. PATENT DOCUMENTS

2002/0064163 A1* 5/2002 Fujiyama .......... H04L 12/40182
370/400
2009/0080462 A1* 3/2009 Mueller .................. H04L 47/10
370/476

OTHER PUBLICATIONS

Extended European Search Report dated Nov. 8, 2016; European Patent Application No. 16 162 940.7—(11) pages.

* cited by examiner

*Primary Examiner* — Clemence Han
(74) *Attorney, Agent, or Firm* — Boyle Fredrickson, SC

(57) ABSTRACT

A method and system for interacting with data frames passing through a module connected to an industrial network is disclosed. Each module includes an aggregation unit located on the network interface above the physical layer. To transmit data, the aggregation unit reads a header from a dynamic data packet to determine if the module is a participant module for the packet. If so, the aggregation unit inserts data from the module into the data packet and transmits the packet to another module. To receive data, the aggregation unit reads a header from the data packet to determine whether the data packet includes data for the module. If so, the aggregation unit reads the data and passes the data packet to another module. If the aggregation unit determines that a data packet is not intended for the module, (Continued)

the data packet is passed to another module with no further interaction.

20 Claims, 5 Drawing Sheets

(51) Int. Cl.
    *G05B 19/418*    (2006.01)
    *H04L 12/407*    (2006.01)
    *H04L 12/417*    (2006.01)
    *H04L 12/437*    (2006.01)

(52) U.S. Cl.
    CPC .......... *H04L 12/417* (2013.01); *H04L 12/437* (2013.01); *G05B 2219/31346* (2013.01)

METHOD AND SYSTEM FOR DATA AGGREGATION IN AN INDUSTRIAL COMMUNICATION PROTOCOL

CROSS REFERENCE TO RELATED APPLICATIONS

This application claims priority to U.S. Provisional Patent Application Ser. No. 62/140,149 filed on Mar. 30, 2015 titled "Method and System for Data Aggregation in an Industrial Communication Protocol" and the disclosure of which is incorporated herein.

BACKGROUND OF THE INVENTION

The present invention relates to a method of aggregating data transmitted via an industrial protocol. More specifically, a method is disclosed for generating a dynamic data frame for transmission from a first module, through multiple additional modules, and to a receiving module and for adding data to the dynamic data frame as it passes through the additional modules.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and execute at well-defined time periods.

As industrial processes grow in complexity, an increasing number of devices are being connected to the industrial controller. The devices are often distributed about a machine or along a process line. An industrial network is typically used to connect the distributed devices and to allow data to be transmitted between the devices. However, the increasing number of devices requires an increased volume of communications between those devices. Yet, the control program still requires that the communications be performed in a well-defined time period. Thus, either the amount of time allocated to communications must increase or the transmission rate must increase. Because the industrial controller typically has a fixed time interval in which to execute each cycle of the program, it is more desirable to increase the transmission rate.

As is known to those skilled in the art, recent techniques to increase the transmission rate include data insertion or extraction from Ethernet frames without fully processing the frame. A master device generates a data frame and circulates it through a series of slave devices in a ring topology. The data frame includes a data block with portions reserved for each slave device. As the frame is received at each slave device, that device may either insert data in, or extract data from, the point in the data block reserved for that device without processing the entire frame. After accessing its portion of the data block, the slave device retransmits the data frame to the next slave device. The last slave device returns the frame to the master device to complete processing of the frame.

However, such systems have not been fully met without incurring various disadvantages. The master device is the only device capable of generating a data frame. The data frame is then circulated in a ring topology to a number of slave devices connected to the master device. Consequently, one slave device wishing to communicate with another slave device upstream from the first device must first insert data into one data frame, and the master device must then include that data into the next data frame from which the upstream slave device may extract the data on a subsequent communication cycle.

Thus, it would be desirable to provide an improved system for increasing the transmission rate on an industrial network that allows bidirectional communication between devices.

Another disadvantage of prior systems is that only one master device may talk to any of the slave devices connected to that master. Although it is common to have multiple, remote master devices, which may communicate with each other, if a remote master device needs data from, or needs to supply data to a slave device connected to a second master device, the remote master device cannot communicate directly with that slave device.

Thus, it would be desirable to provide an improved system for increasing the transmission rate on an industrial network that provides for improved communication between remote devices.

BRIEF DESCRIPTION OF THE INVENTION

The subject matter disclosed herein describes an improved system for increasing the transmission rate on an industrial network that allows bidirectional communication between devices and an improved system for increasing the transmission rate on an industrial network that provides for improved communication between remote devices. A first module is configured to generate a dynamic data packet which will provide data transfer between multiple modules and a receiving module. The dynamic data packet is configurable in real time to identify different groups of modules to participate in the dynamic data packet and includes a header that identifies the modules participating in the dynamic data packet. Each module includes an aggregation unit and the dynamic data packet is passed sequentially through the aggregation unit of each module between the first module and the receiving module. The aggregation unit first inspects the header to determine if the module in which the aggregation unit resides is to participate in the dynamic data packet. If the module is not participating in the dynamic data packet, the aggregation unit passes the dynamic data packet to the next module in the chain between the first module and the receiving module. If the module is participating in the dynamic data packet, the module inserts its participant data in the dynamic data packet, determines a new checksum for the data packet, and replaces the existing checksum with the new checksum. After inserting the participant data from the corresponding module in the dynamic data packet, the aggregation unit passes the dynamic data packet to the next module in the chain between the first module and the receiving module. The receiving module, therefore, receives a single data packet containing the data from each of the participating modules rather than multiple data packets, where a separate packet is sent from each module.

In return, the receiving module can send a single packet with data for each of the participating modules. The receiving module generates the data packet and inserts an identifier and data for each module to which it intends to transmit data. The data packet is transmitted from the receiving module back to the first module. At each module connected between the receiving module and the first module, the aggregation unit inspects the packet to determine whether the corresponding module for the aggregation unit is identified within the packet. If the module is not receiving data from the data packet, the aggregation unit passes the data packet to the next module in the chain between the receiving module and the first module. If the module is receiving data from the data packet, the module reads the data intended for the module from the packet and then passes the data packet to the next module in the chain between the receiving module and the first module. Thus, a single return data packet may transmit data to multiple modules rather than the receiving module generating separate return packets to each of the participating modules. It is contemplated that the dynamic data packet and the return data packet may be transmitted between any two devices within the industrial network with the first module defining the destination and any participating modules located between the first module and the receiving module.

According to one embodiment of the invention, a method for transmitting data from multiple sending modules to a single receiving module is disclosed. The method includes generating a dynamic data frame, including a proprietary header, in a first sending module, and receiving the dynamic data frame at an aggregation unit in each of the sending modules from another of the sending modules. Each sending module determines from the proprietary header whether the sending module is a participant in the dynamic data frame. When the sending module determines it is a participant in the dynamic data frame, the aggregation unit adds participant data to the dynamic data frame and transmits the dynamic data frame with the added participant data to either another sending module or to the receiving module.

According to another embodiment of the invention, a module for communicating a dynamic data frame on an industrial network is disclosed. The module includes a first port, a second port, and an aggregation unit. The first port is operable to receive the dynamic data frame from the industrial network, where the dynamic data frame includes a proprietary header. The second port is operable to transmit the dynamic data frame on the industrial network, and the aggregation unit is in communication with the first port and the second port. The aggregation unit is operable to receive the dynamic data frame from the first port, determine from the proprietary header whether the module is a participant module for the dynamic data frame, add participant data to the dynamic data frame when the module is a participant module, and transmit the dynamic data frame with the added participant data via the second port.

According to still another embodiment of the invention, a system for reducing network traffic on an industrial network is disclosed. The system includes multiple sending modules and a receiving module. Each sending module includes a first port, a second port, and an aggregation unit. The first port is operable to receive the dynamic data frame from the industrial network, where the dynamic date frame includes a proprietary header. The second port is operable to transmit the dynamic data frame on the industrial network, and the aggregation unit is in communication with the first port and the second port. The aggregation unit is operable to receive the dynamic data frame from the first port, determine from the proprietary header whether the module is a participant module for the dynamic data frame, add participant data to the dynamic data frame when the module is a participant module, and transmit the dynamic data frame with the added participant data via the second port. The receiving module includes a communication port and a processor. The port is in communication with the industrial network to receive the dynamic data frame from one of the plurality of sending modules, and the processor is operable to extract the participant data for each of the plurality of sending modules from the dynamic data frame.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
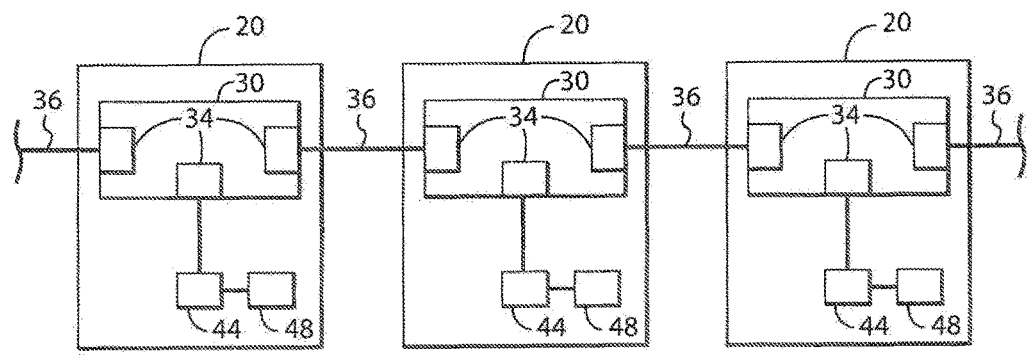
FIG. 1 is a block diagram representation of multiple modules connected via an industrial network according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, three modules 20 incorporating one embodiment of the invention are connected via a network medium 36. The network medium 36 may be any suitable medium including, but not limited to, a network cable, a backplane, or wireless connection points. Each module 20 includes a network interface 30 which, in turn, includes ports 34 configured to connect to the network medium 36. Each network interface 30 may also include a port 34 configured to communicate with a processor 44 in the module 20. Each network interface 30 has one or more buffers 56 (see also FIG. 4) in communication with the port 34 for temporarily storing data received at or to be transmitted from the port 34. It is also contemplated that each module 20 may have numerous other hardware configurations without deviating from the scope of the invention. For example, the processor 44 and/or memory device 48 may be integrated with the network interface 30 on a single field programmable array (FPGA) or application specific integrated circuit (ASIC).

Figure 2:
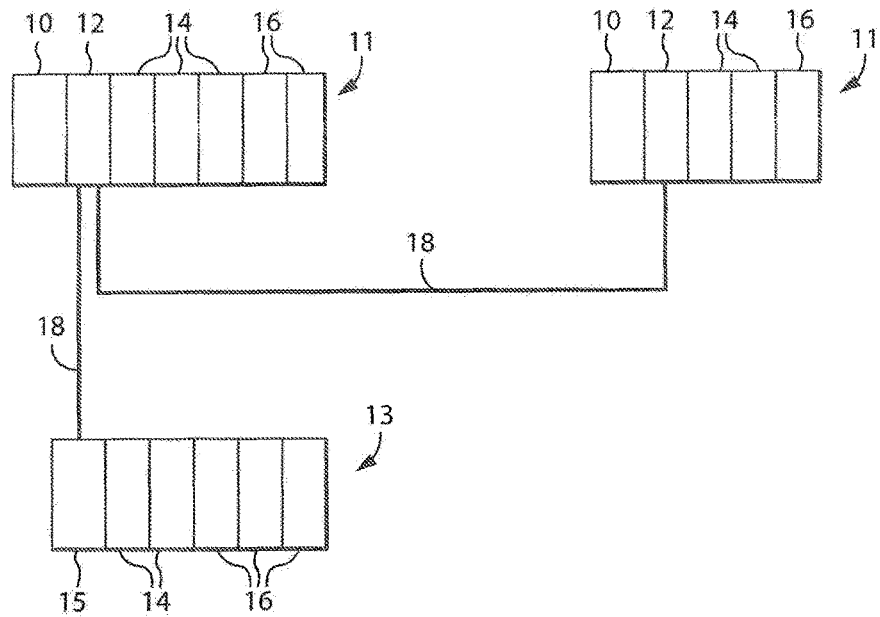
FIG. 2 is a block diagram representation of an exemplary environment incorporating one embodiment of the present invention.

Referring next to FIG. 2, an exemplary environment, incorporating the present invention includes a pair of industrial controller racks 11 and a remote Input/Output (I/O) rack 13. Although referred to herein as controller and remote I/O racks, it is contemplated that individual modules mounted adjacent to each other within a control cabinet may also be used. Individual modules may be configured, for example, to mount to DIN rail in one or more banks of modules. Each of the industrial controller racks 11 includes a power supply module 10, a processor module 12, input modules 14, and output modules 16. The remote I/O rack 13 includes an interface module 15 which manages communication between the industrial controller rack 11 and the input modules 14 and output modules 16 contained within the remote I/O rack 13. A communication cable 18 connects the processor modules 12 to each other and to the interface module 15. The communication cable 18 may be a cable configured to use any suitable communication protocol as is known in the art. It is understood that the industrial controller racks 11 and remote I/O rack 13 may include numerous configurations of modules or, optionally, be integrated into a controller with a fixed configuration.

Figure 3:
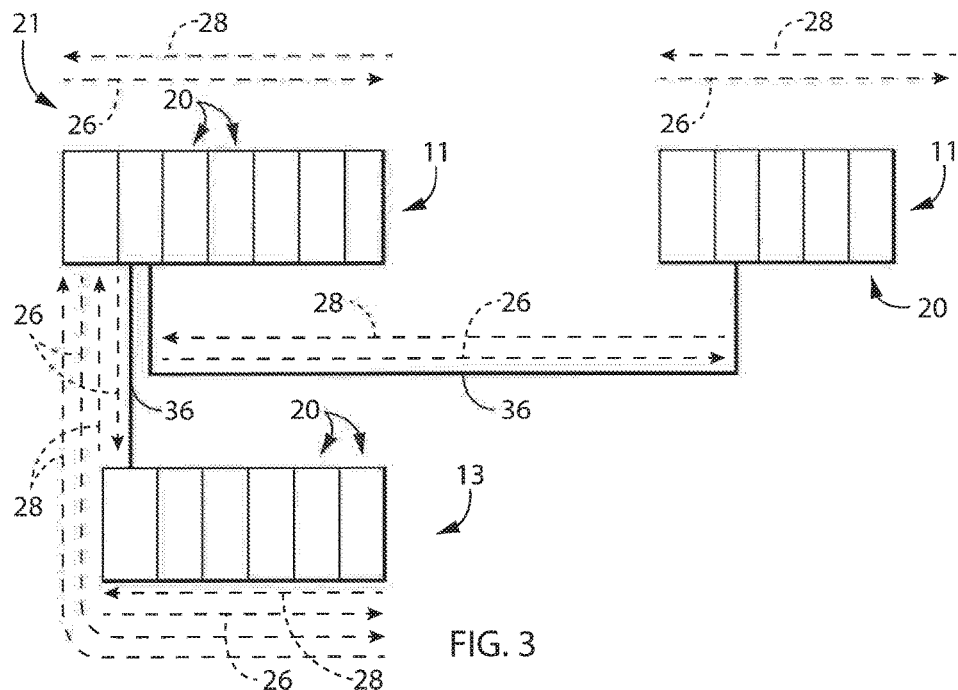
FIG. 3 is a block diagram representation illustrating communication paths between modules within the environment of FIG. 2.

Referring next to FIG. 3, an exemplary network 21 configured to operate on the environment of FIG. 2 is illustrated. Each of the processor modules 12, input modules 14, and output modules 16 may be referred to simply as a module 20. Each module 20 in a rack or along a bank of modules 20 is in communication with an adjacent module 20 via a backplane or another connector. In a rack configuration, each module 20 may include an electrical connector on the rear for insertion into a backplane within the rack. When mounted to a DIN rail, electrical connectors (not shown) on each side of the module 20 may be connected directly with a corresponding connector on the adjacent module 20 or an appropriate cable may be inserted between connectors. Further, a portion of the modules 20 may be connected to other modules via a network medium 36. Examples of bi-directional communications between modules 20 are illustrated in FIG. 3, with transmissions in either a first direction 26 or a second direction 28 between two modules 20 being sent through multiple modules. Any of the modules 20 along a communication path may access a data frame being passed through the module 20 in either the first or second direction, 26 or 28, to provide data to or receive data from another of the modules 20. As will be discussed in more detail below, each module 20 may be configured to initiate data frames to any other module 20 to effect the aggregate communication with various other modules 20 located in between the source and destination module 20.

Figure 4:
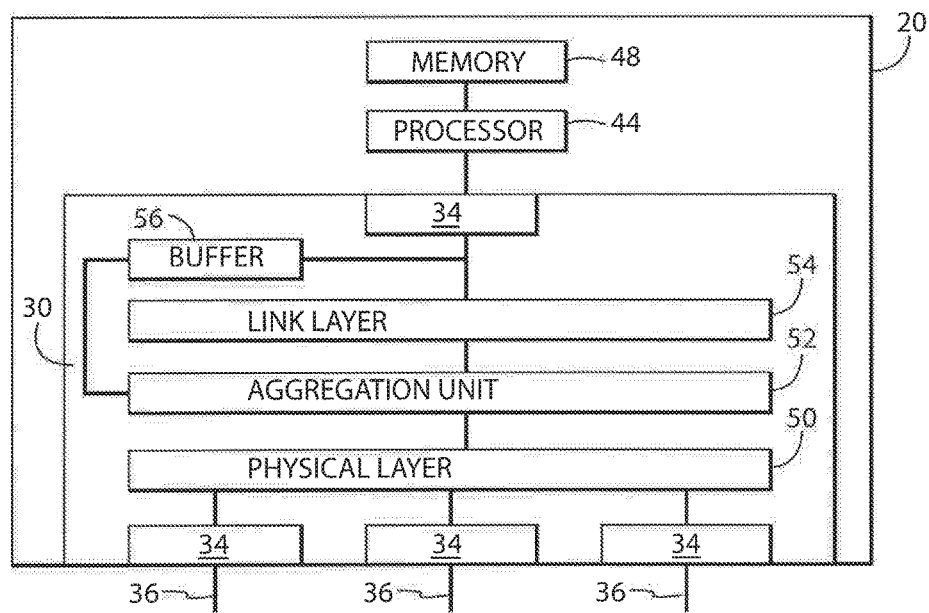
FIG. 4 is a block diagram representation of a module of FIG. 3.

Turning next to FIG. 4, an exemplary module 20 is illustrated. The module 20 includes multiple ports 34 connected to network media 36 located on a network interface 30. The port 34, in turn, connected to other electronic devices or circuits that constitute the physical layer 50 of the network as would be understood by one skilled in the art. An aggregation unit 52 is inserted between the physical layer 50 and the link layer 54 of each module 20. The aggregation unit 52 may be implemented by discrete electronic components, a portion of an FPGA or ASIC, or a combination thereof. The aggregation unit 52 is configured to interrogate data packets being transmitted between the physical layer 50 and the link layer 54 as will be discussed in detail below. The aggregation unit 52 is in communication with one or more buffers 56 from which it may insert data into data packets or to which it may write data received from data packets. The link layer 54 is in communication with a port 34 to transmit data packets to the processor 44 or, optionally, to other dedicated communication processing circuits.

In operation, the data aggregation method disclosed herein reduces network traffic for improved transmission of data by allowing multiple sending modules to communicate with a single receiving module in a single message. Further, the aggregation method supports bidirectional communication by having the single receiving module generate a single message that may communicate with the multiple sending modules. The aggregation unit 52 of each sending module may interact with the data messages to insert data in or extract data from the message and then pass the message to the next sending module.

Figure 6:
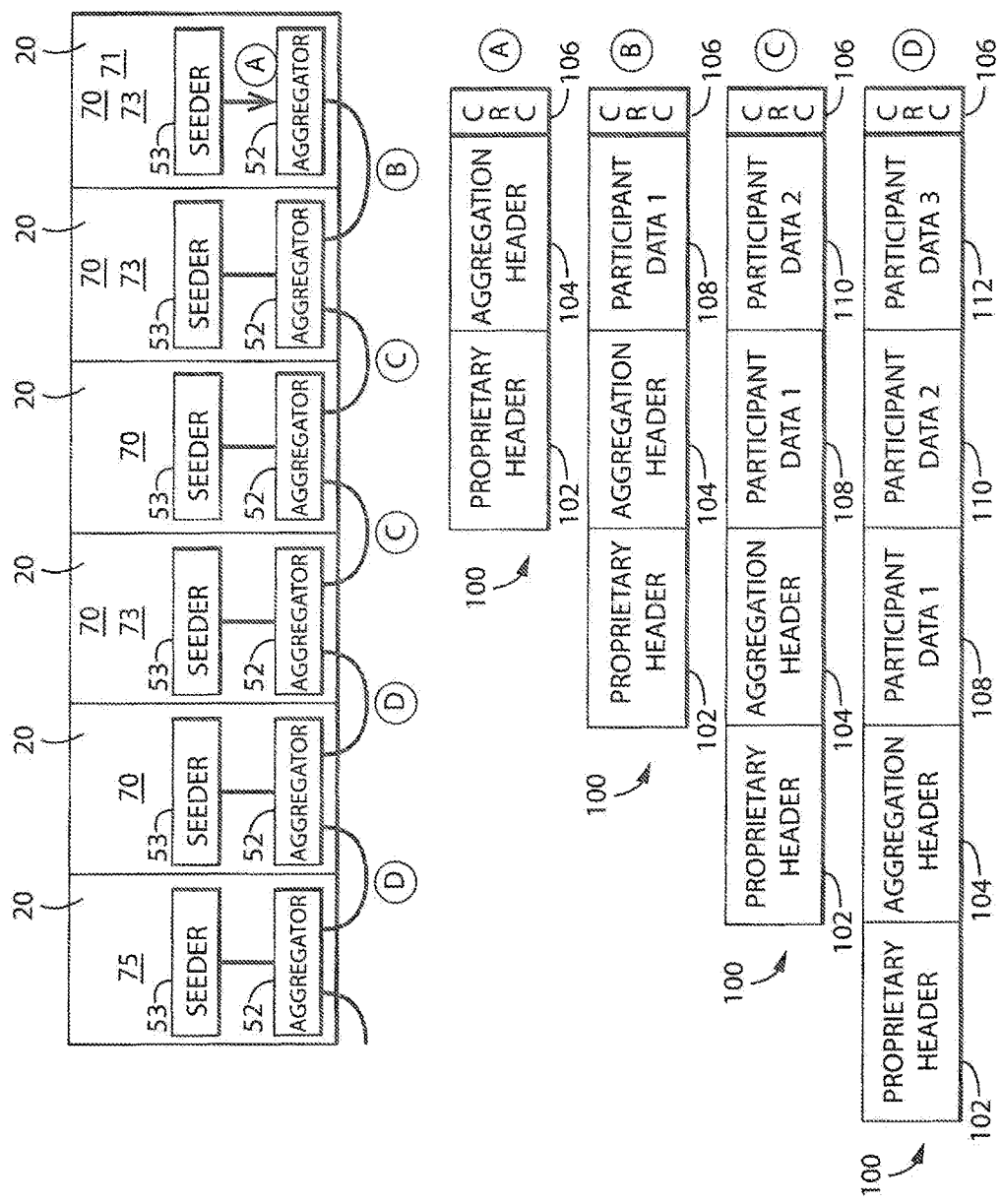
FIG. 6 is a block diagram representation of multiple modules adding participant data to a dynamic data frame according to one embodiment of the invention.

With reference next to FIG. 6, communication from the sending modules to the receiving module will first be discussed. For purposes of illustration, a bank of modules 20 is illustrated in which five of the modules are designated as sending modules 70 and one module is designated as a receiving module 75. In addition, the right-most module will be designated as a seeder module 71, meaning it will generate the data message and initiate sending the message to the receiving module 75. It is understood that various other numbers of modules may be included and that each of the modules 20 may be a seeder module 71 for different data messages. Further, each module 20 may be a receiving module 75 with respect to different data messages. Although all of the modules 20 are illustrated in a single bank, it is further contemplated that a seeder module 71 and a receiving module 75 may be located in different banks connected by appropriate network media.

The seeder module 71 will initiate the data communications by generating a blank, dynamic data frame, A, in a seeder unit 53. It is contemplated that the seeder unit 53 may be included on the network interface 30 or within the processor 44 of the seeder module 71. As shown in FIG. 6, the blank data frame, A, includes two header segments and a checksum 106. A first header is a proprietary header 102 for the industrial control system. The proprietary header 102 may include information such as a source address and a destination address for the data frame. The proprietary header 102 may further include information regarding the version of the communication protocol and the type of frame being generated. A connection identifier may also be included in the proprietary header 102. Each module 20 is configured to read the proprietary header 102 and determine based on the version of the protocol and the type of data frame how to further process the data frame. For example, a first type of data frame is defined for messages being sent from the sending modules 70 to the receiving module 75 and a second type of data frame is defined for messages being sent from the receiving module 75 to the sending modules 70. Further, by including a record of the version of the protocol creating the data frame, subsequent modules executing a different version of the protocol may handle the data frame according to the version of the protocol that generated the data frame.

A second header in the blank data frame, A, is an aggregation header 104. The aggregation header 104 may include information specific to the aggregation process, such as an identification of the seeder module 71 initiating the data frame and an aggregation message identifier. Optionally, the connection identifier in the proprietary header 102 may serve as an aggregation message identifier. According to one embodiment of the invention, aggregation message identifiers are generated during design or commissioning of the control system. Each module 20 participating in a particular data frame may be assigned an aggregation position within the aggregation message. With reference again to FIG. 6, each sending module 70 that is participating in the illustrated communication is further identified as a participating module 73. Although the illustrated data frame is passed through five sending modules 70, only three of the sending modules 70 are adding data to the data frame and are, therefore, considered participating modules 73. The aggregation message identifier and corresponding aggregation position of each participating module 73 may be stored in the memory 48 of the corresponding participating module for each aggregation message. Optionally, a complete table of aggregation messages may be defined and further associate a module identifier, such as a slot address of each participating module 73 with the aggregation message identifier and aggregation position within the specific message, and the complete table may be stored in the memory of each module 20. According to another embodiment of the invention, the aggregation header 104 may include a module identifier, such as the slot address of the participating module 73, and an aggregation position within the data frame corresponding to the module identifier of each participating module 73. According to still another embodiment, the proprietary header 102 and the aggregation header 104 may be combined into a single header. According to still other embodiments, segments in each header may be included in the other header.

The blank data frame, A, also includes a checksum 106. Although illustrated as a cyclic redundancy check (CRC), it is contemplated that other types of checksums may be utilized. Initially, the checksum 106 is determined only on the information in the first header 102 and the second header 104. Optionally, the checksum 106 may be omitted or left blank in the blank data frame, A, and added when the blank data frame is passed to the aggregation unit 52 of the seeder module 71.

After generating the blank, dynamic data frame, A, the seeder unit 53 in the seeder module 71 passes the blank, dynamic data frame, A, to the aggregation unit 52, also referred to herein as the aggregator. The aggregation unit 52 reads the blank data frame, A, and determines from the data contained within either the proprietary header 102, aggregation header 104, or a combination thereof that the message is to be a dynamic data frame transmitted via multiple sending modules 70 to a single receiving module 75. The aggregation unit 52 also determines whether each sending module 70 is a participating module 73 for the particular data frame 100. The aggregation unit 52 reads an identifier for the aggregation message from the dynamic data frame 100, such as the connection identifier in the proprietary header 102 or an aggregation message identifier in the aggregation header 104 to determine which aggregation message it received. The aggregation unit 52 compares the identifier to the table of messages to determine whether it is a participant in the message. Optionally, if participant identifiers are included in the aggregation header 104, the aggregation unit 52 reads the identifiers for participants and determines whether the corresponding module is a participant module 73. According to still another embodiment, if the data frame 100 is a blank data frame, A, the aggregation unit 52 recognizes that the seeder unit 53 in the same module generated the data frame and that the module is a participating module 73.

After determining that the module is a participating module 73 with respect to the data frame received at the aggregation unit 52, the aggregation unit 52 inserts participant data for the module into the data frame 100. The aggregation unit 52 reads the aggregation position for which it is to insert data into the dynamic data frame 100. The aggregation position identifies a location within the payload of the dynamic data frame 100 at which the participant data is to be inserted. According to the illustrated embodiment in FIG. 6, each successive participant module 73 has an aggregation position incrementally greater than the prior participant module 73. That is, the first, or right-most, participant module 73 has an aggregation position equal to one. It inserts its participant data 108 in the first location of the payload for the dynamic data frame 100. The resulting data frame is identified by reference letter "B". The next participant module 73, located second from the right, has an aggregation position equal to two. It inserts its participant data 110 in the second location of the dynamic data frame 100. It is contemplated that if a participant module 73 has, for example, an aggregation position of two and the participant module 73 with an aggregation position of one either had no data for insertion or has not yet received the data frame, the aggregation unit 52 may insert a blank segment in the payload prior to inserting the participant data 110 for the second participant module 73. Alternately, the aggregation unit 52 of each participant module 73 may insert its respective participant data at the next available segment in the payload for the dynamic data frame without regard to the aggregation position of the module or to the existing participant data within the payload.

Figure 7:
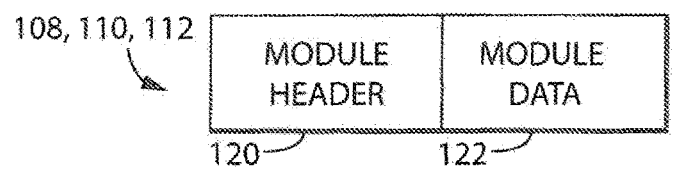
FIG. 7 is a block diagram representation of the participant data of FIG. 6.

With reference also to FIG. 7, each participant data 108, 110, 112 may include both a module header 120 and a module data 122 segment. The module header 120 includes identifying information with respect to the particular module 20 that inserted the module data 122. As a result, if a participant module 73 does not have data to insert when the dynamic data frame 100 is received and passes the data frame 100 without inserting data, the receiving module 115 may read the module header 120 and determine what type of data is present in the respective module data 122 and from which module 20 the data was received.

Turning back to FIG. 6, three of the sending modules 70 are participant modules 73 in the dynamic data frame 100. The right-most module is the seeder module 71 and generates the blank data frame, A, in its seeder unit 53. The seeder module 71 passes the blank data frame, A, to the aggregation unit 52 in the seeder module 74. The aggregation unit 52 determines that the seeder module 71 is also a participant module 73 and inserts the first participant data 10S in the dynamic data frame 100. The aggregation unit also determines a new checksum 106 for the dynamic data frame based on the headers 102, 104 and the new payload that includes the first participant data 108. The aggregation unit 52 replaces the existing checksum 106 with the new checksum thereby generating the new dynamic data frame, B. The new dynamic data frame, B, is passed to the next module to the left of the seeder module 71.

With reference also to FIG. 4, the aggregation unit 52 receives the dynamic data frame, B, from the physical layer 50 of the module 20. The aggregation unit identifies the dynamic data frame, B. and determines that it is to be a participant in the dynamic data frame, B. The aggregation unit 52 appends the second participant data 110 to the dynamic data frame, B, and again recalculates the checksum 106 based on the headers 102, 104, and both participant data 108, 110 in the payload of the dynamic data frame. The aggregation unit 52 replaces the existing checksum 106 with the new checksum thereby generating another new dynamic data frame, C. The aggregation unit 52 then passes the new dynamic data frame, C, to the next sending module 70 without passing the data frame 100 further up the network stack.

The aggregation unit 52 of the third sending module 70 from the right receives the new dynamic data frame, C. The third sending module 70, however, determines that it is not a participant module. The aggregation unit 52, therefore, passes the new dynamic data frame, C, directly to the next adjacent sending module 70 without further processing. The afore-described process is repeated for each of the subsequent sending modules 70 determining whether it is a participant module 73 with respect to the dynamic data frame. The fourth sending module 70 is the third participant module 73 and inserts the third participant data 112 in the dynamic data frame and calculates a new checksum 106, generating still another new dynamic data frame, D. The fifth sending module 70 determines that it is not a participant module and passed the dynamic data frame, D, to the receiving module 75.

According to another aspect of the invention, the aggregation unit 52 may detect errors in the dynamic data frame as it is passed through each module 70. Each aggregation unit 52 may be configured to read the checksum 106 when a new dynamic data frame 100 is received and verify that the checksum 106 is correct based on the content of the data frame 100 as it is received. If the checksum 106 does not correspond to the content of the data frame 100, the aggregation unit 52 may identify the data frame 100 as containing an error. The modules 70 may be configured to handle corrupted data frames in different manners. For example, an aggregation unit 52 may set a flag within the data frame 100 indicating an error was detected. The aggregation unit 52 may allow the data frame to be passed on through subsequent modules 70 to the receiving module 75. Each subsequent aggregation unit 52 may also be configured to monitor the error status flag such that it does not insert any further participant data after an error has been detected in the frame. When the data frame 100 reaches the receiving module 75, the receiving module 75 may then handle the corrupt data frame 100 by dropping the frame or requesting that a new frame be sent. Optionally, each aggregation unit 52 may be configured to drop a corrupt data frame with no further action taken by the aggregation unit 52. If a problem exists that results in continued corruption of the data frame 100, the receiving unit 75 may detect the problem through a timeout mechanism when an expected data frame 100 is not received within an expected interval.

The receiving module 75 reads the destination address from the proprietary header 102 and determines that it is the intended recipient of the dynamic data frame, D. The aggregation unit 52 for the receiving module 75 passes the dynamic data frame 100 up the network stack for the receiving module 75 for further processing. The receiving module may, for example, extract the participant data 108, 110, or 112 for use or, optionally, may encapsulate the participant data or the entire data frame 100 within another data packet, such as an Ethernet packet for transmission to another device in the industrial control system.

Figure 5:
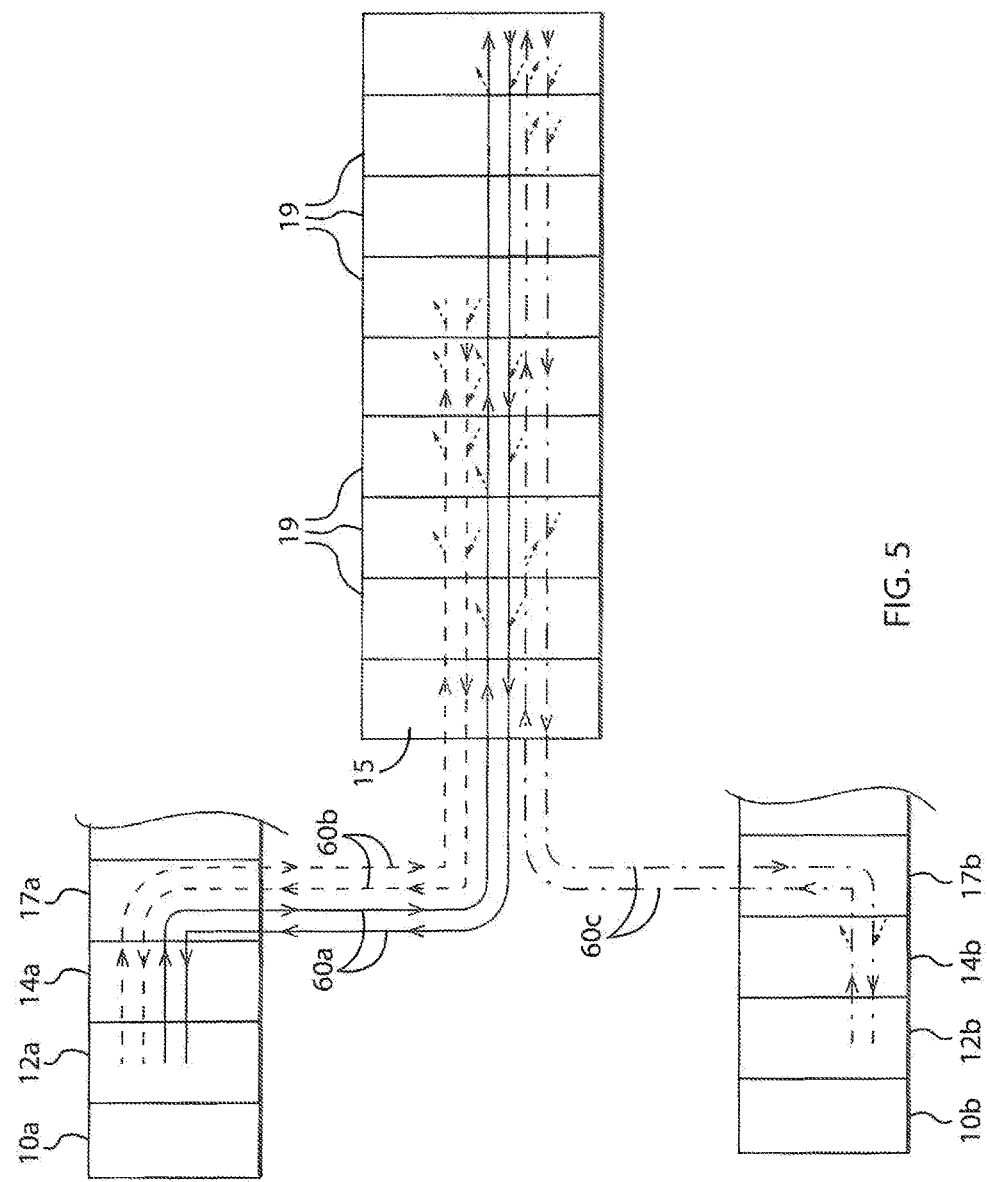
FIG. 5 is a block diagram representation of several connections between remote modules according to one embodiment of the invention.

Turning next to FIG. 5, it is contemplated that multiple dynamic data frames 100 may be configured for transmission within an industrial control system. FIG. 5 illustrates multiple connections 60 established between different devices within the system, where a dynamic data frame may be transmitted along any of the connections. According to the illustrated embodiment, two separate industrial controller banks are communicating with a remote I/O bank. Each industrial controller bank includes a power supply module 10a, 10b, a processor module, 12a, 12b, an input module 14a, 14b, and a bridge module 17a, 17b. It is further contemplated that still additional modules may extend beyond each bridge module 17a, 17b. Each bridge module 17a, 17b is in communication with an adapter module 15 on the remote I/O bank. The remote I/O bank includes multiple modules 19 which could be any combination of input modules 14 or output modules 16 according to the system requirements. A first connection 60a is established between the first processor module 12a and the last module 19 on the remote I/O bank, and a second connection 60b is established between the first processor module 12a and the fifth module 19 (counted from the left side) on the remote I/O bank. A third connection 60*l* is established between the second processor module 12b and the last module 19 on the remote I/O bank. Each of the modules 19 in the remote I/O bank may be considered sending modules 70 with respect to each of the connections 60a, 60b, 60c. The short arrows leaving from or pointing toward the connection 60 in each of the modules 19 identifies a module as participating in the connection. The first, third, fourth, and eight modules 19 are participating modules 73 on the first connection 60a. The second, third, fourth, and fifth modules 19 are participating modules 73 on the second connection 60b. The third, seventh, and eighth modules 19 in the remote I/O bank as well as the input module 14b on the second industrial controller bank are participating modules 73 on the third connection. The last module is the seeder module 71 for the first and third connections 60a, 60e while the fifth module is the seeder module 71 for the second connection 60b. It is noted that rather than opening nine separate connections between each processor module 12a, 12b and one of the modules 19 to which it is communicating, three connections 60 are established, thereby reducing the number of connections and messages being transmitted on the industrial network.

It is further contemplated that the modules 19 selected as participating modules 73 may be selected to provide more efficient processing in the processor module 12a, 12b. For example, two separate connections 60a, 60h are established between the first processor module 12a and the remote I/O bank. Although a single connection could be established between the processor module 12a and all of the modules could be defined as participating modules, it is contemplated that the I/O communicated on each connection 60 is related in a desirable manner for utilization on the processor module 12a. For example, the I/O may be of a similar priority level, I/O type (e.g., analog, digital), input versus output, or utilized in the same module of a control program. Still other groupings of data may include, but are not limited to occurrence of specific events, topology of the industrial network, data size, or the time or frequency of occurrence. I/O data may, therefore, be reported to the industrial controller in a more efficient manner, for example, only at intervals required by the control program or upon the occurrence of specific events. By appropriate grouping of data within dynamic data frames, network traffic may be reduced and controller processing may also be made more efficient.

In order to insert data in the dynamic data frame, each participant module prepares the data to be inserted prior to receiving the data frame. With reference again to FIG. 4, each module 20 includes one or more buffers 56. According to the illustrated embodiment, the buffer 56 is located on the network interface 30. Optionally, the buffer 56 may be assigned to a dedicated portion of the memory device 48. In either embodiment, the processor 44 and the aggregation unit 52 are both in communication with the buffers 56.

The processor 44 is configured to write the participant data to the buffer 56 in preparation for insertion into the dynamic data frame. If, for example, the module 20 is an input module, the processor 44 receives each of the input signals from devices on the machine or process being controlled by the industrial control system. The processor 44 maintains an input table within its memory 48 of the current state of each input. The participant data for the module 20 may include the input table such that the input module transmits the state of the inputs back to a processor module 12 executing a control program. The processor 44 may be configured to write the current state of the input table to a buffer 56, for example, at a periodic interval or when the state of one of the inputs changes. The processor 44 writes the data to the buffer 56 and sets a status flag indicating the data is ready for insertion into a data frame.

Once data is present in the buffer 56, the aggregation unit 52 waits for the next dynamic data frame in which it is a participant to insert the data. As discussed above, when the aggregation unit 52 receives a dynamic data frame it first determines whether the module 20 is a participant in that data frame. If not, the aggregation unit retransmits the data frame to the next module 20. If the module 20 is a participant, the aggregation unit 52 cheeks the status flag to determine whether the buffer 56 has data ready for insertion into the dynamic data frame. If data is ready in the buffer 56, the aggregation unit reads the data from the buffer 56 and resets the status flag, indicating that the data in the buffer 56 has been read and will be inserted into the data frame. The aggregation unit 52 then inserts the data as participant data into the dynamic data frame. With reference again to FIG. 7, the data in the buffer 56 may be written as module data 122 and the aggregation unit 52 also inserts a module header 120 indicating, for example, the type of data (e.g., input data, analog, digital, etc. . . . ) and the source of data such that the control program receiving the participant data knows how to process the module data 122.

If, however, the status flag has not been set, this indicates that the processor 44 has not written data to the buffer 56. There may be any number of causes for the processor 44 not setting the status flag. For example, if the processor 44 is configured to write data to the buffer at a periodic interval, the interval may be at a time greater than the interval of the dynamic data frame. It is possible an error occurred during a write and the processor 44 has not completed a second attempt to write data. Alternately, an interrupt on the module 20 may require the processor 44 to attend to another task and skip one or more writes of data. It is also possible that the processor 44 is configured to write data to the buffer only when the status of the data has changed. Certain data, such as temperature information, may change slowly and therefore require infrequent updates. Thus, multiple dynamic data frames may be received between having the status of the data change and, subsequently having the processor write data to the buffer 56. When there is no data present in the buffer 56 for insertion into the dynamic data frame, the aggregation unit 52 retransmits the data frame to the next module 20 without inserting its participant data.

Because the aggregation unit 52 checks that each participant module has data present in the buffer 56 prior to inserting participant data into a dynamic data frame, the resulting dynamic data frame may be of a varying length when it reaches the receiving module. The receiving module, therefore, extracts the module header 120 for each of the participant data segments to identify which module inserted the corresponding module data 122 and how to process the module data 122 which was present in the dynamic data frame.

According to another aspect of the invention, the dynamic data frame may have a maximum payload length according to limits from the network or the module. Because participant data may be inserted when it is available or at varying intervals, a dynamic data frame may be configured to include more participant modules 73 and, subsequently, receive more participant data than it can accept in a single data frame. It is contemplated that due to the variable nature of data insertion, that many of the data frames 100 will be able to accommodate all of the participant data that is ready for insertion within each frame. However, if the number of modules 70 with data read ion insertion into the data frame 100 is enough that the amount of participant data exceeds the maximum payload for the data frame, a module 70 may become a new seeder module 71 and generate a second, identical dynamic data frame 100. The aggregator unit 52 receives the new, blank data frame and inserts the participant data for the new seeder module in the new data frame. The aggregator unit 52 may then pass then new dynamic data frame to the next module in advance of the full data frame. In this manner, subsequent data frames first receive the data frame that has room for additional participant data and each subsequent participating data frame 73 inserts its participant data in the new data frame. The full dynamic data frame is received next, however, because the participant module has just inserted its data in the second dynamic data frame, its buffer 56 does not have new data ready and the second dynamic data frame is passed on without the generation of a new data frame at each subsequent participant module 73. Optionally, the new seeder module 71 may set a status flag in one of the headers of the full dynamic data frame that signals to subsequent aggregation units 52 to pass on the full dynamic data frame and wait for the second dynamic data frame.

It is further contemplated that a module 20 may be a participant in multiple dynamic data frames. Multiple buffers 56 may be utilized where a separate buffer 56 is assigned to each of the dynamic data frames in which the module 20 is a participant. The processor 44 prepares and inserts the appropriate data for each of the dynamic data frames and sets a respective status flag for each buffer 56. The aggregation unit 52 knows which buffer 56 is assigned to each of the dynamic data frames. When one of the dynamic data frames arrives at the module 20, the aggregation unit 52 identifies which data frame has arrived and checks the status flag for the corresponding buffer 56 to verify whether the data for that data frame is ready. If the data for the corresponding data frame is present in its respective buffer 56, the aggregation unit 52 inserts the data into the dynamic data frame and retransmits the new data frame to the next module 20. If the data liar the corresponding data frame is not present in its respective buffer 56, the aggregation unit 52 passes the dynamic data frame to the next module 20 with no modification.

Figure 8:
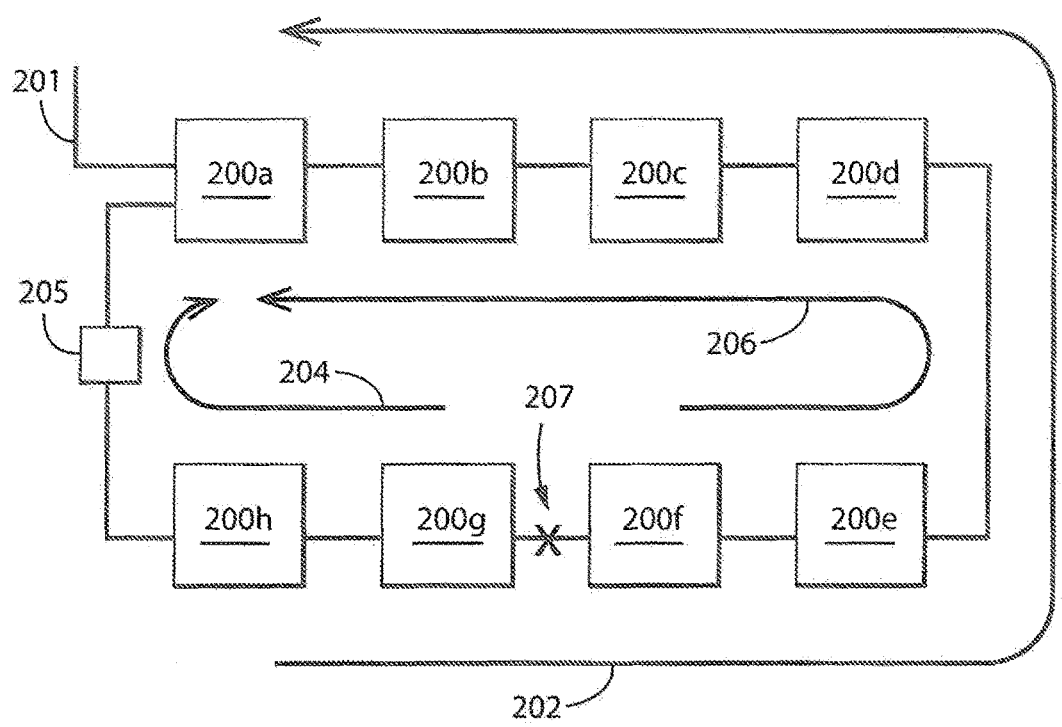
FIG. 8 is an exemplary set of modules arranged in a ring topology incorporating one embodiment of the present invention.

The data aggregation method disclosed herein may be utilized to maintain communications between devices in the event of a failure in the industrial network. With reference now to FIG. 8, an exemplary set of modules 200 is arranged in a ring topology. A first module 200a may be configured to communicate with an external network 201 as well as with the ring of modules 200. According to the illustrated embodiment, the ring topology is utilized to provide redundant communication paths in the event of a failure of one of the communication paths rather than providing continuous connection in either direction between devices. As a result, an initial break, or stop, 205 in the ring is defined to prevent messages from passing between module 200a and module 200h. Data may be passed between the external network 201 and the first module 200a and then each module 200a-200h is in communication with each other in a daisy chain format.

A first data connection 202 may be established between the last module 200h and the first module 200a in the chain. The last module 200h is defined as the seeder module and generates a dynamic data frame. The dynamic data frame is passed sequentially through each of the modules to the first module 200a, which is defined as the receiving module. Although any combination of modules may be participant modules, for purposes of illustration, each of the modules 200b-200h will be participants in the dynamic data frame. Thus, as the dynamic data frame is passed between each of the modules, the module inserts its respective participant data in the dynamic data frame in the manner described above.

In the event of a failure in the ring topology, the ring network may be configured to detect alternate communication paths. In the illustrated embodiment, a failure 207 occurs in the network medium between modules 200g and 200f. The ring network detects the additional network connection between 200a and 200h and allows communication to begin occurring between the two devices to compensate for the fault 207. As a result, module 200a can again communicate with each of the other modules, albeit via two different paths.

In the event of a network failure, the aggregation method can also detect the failure of the network and reconfigure the modules such that communications continue. Each module may receive notification of the failure 207 in the ring topology. If a dynamic data frame is originally configured to be transmitted across the failure 207, new seeder modules are defined. Each of the modules 200g, 200f located on either side of the failure 207 are assigned as seeder modules for the dynamic data frame that was previously sent by module 200h. Thus, module 200g is a first new seeder module and 200f is a second new seeder module. Further, module 200h stops generating the dynamic data frames. Each of the new seeder modules 200g, 200f establish new connections 204, 206 to the first module 200a and begin transmitting the same dynamic data frame that was previously transmitted from module 200h. The dynamic data frame generated by the seeder unit in module 200g will pass through the aggregators of modules 200g and 200h, while the dynamic data frame generated by the seeder unit in module 200f will pass through the aggregators of modules 200f, 200e, 200d, 200c, and 200b. As discussed above, if a module is not present or the data is not ready, the dynamic data frame is passed to the next module without insertion of participant data. Thus, each of the data frames will appear to receiver 200a as if a portion of the modules were not present or did not have data. However, receiver 200a will be able to read the participant data from each of the dynamic data frames to receive a complete set of data. By reconfiguring the modules to have a seeder unit on each side of the network failure 207 generate the dynamic data frame that previously passed across the point of failure 207, communications in that ring of the industrial control system may continue as if no failure 207 existed.

As indicated in FIG. 5, each connection 60 permits bi-directional communications. The disclosure above has discussed a dynamic data frame transmitted from a remote sending module through multiple other sending modules and being received at a receiving module. It is often desired that the receiving module be able to send a return message and/or initiate communications with the sending modules along each connection 60. Because the receiving module is transmitting data to multiple recipients, the data for each recipient must be included in the original data frame. The receiving module may include a table in its memory identifying each dynamic data frame it receives and the participant modules that exist along the dynamic data frame. When the receiving module sends a return message or initiates communication, it may read an identifier for each participant module and determine whether it has information to send to the participant module.

According to one embodiment of the invention, the receiving module may generate a fixed length data frame for return messages along each connection 60. The fixed length data frame may include a segment for each participant module along the connection. The receiving module includes an identifier in either the proprietary header or an aggregation header to identify the message as a message from the receiving module to the participant modules. If the data frame is a fixed length, the receiving module may insert just data for each of the participant modules in a fixed order. Each participant module may then read the data intended for that module from the known location. Optionally, the receiving module may include both a module header and module data. The participant module may then locate the module header identifying itself and read any associated module data inserted by the receiving module.

According to another embodiment of the invention, the receiving module may generate a varying length data frame for return messages along each connection 60. If the data frame is of varying length, the receiving module includes both the module header and the module data such that each participant module may then locate the module header identifying itself and read the associated module data inserted by the receiving module. With a varying length return message, the receiving module only inserts data for those modules with which it needs to send data, and the network utilization of data messages sent in the reverse direction along each connection 60 may be reduced when compared to a Fixed length return data frame.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for transmitting data from a plurality of sending modules to a receiving module in a single data frame, the method comprising the steps of:

generating a dynamic data frame in a first sending module, wherein:
  a header in the dynamic data frame includes a destination address and a connection identifier,
  the destination address corresponds to the receiving module for which the dynamic data frame is intended, and
  the connection identifier corresponds to the dynamic data frame;
receiving the dynamic data frame sequentially in an aggregation unit at each of the plurality of sending modules from another of the plurality of sending modules;
reading the connection identifier from the dynamic data frame with each aggregation unit;
determining from the connection identifier, whether the sending module at which the dynamic data packet is presently located is a participant in the dynamic data frame;
adding participant data to the dynamic data frame via the aggregation unit when the sending module determines it is a participant in the dynamic data frame, wherein the added participant data increases a length of the dynamic data frame; and
transmitting the dynamic data frame with the added participant data from the aggregation unit to one of another of the plurality of sending modules and the receiving module.

2. The method of claim 1 wherein the participant data includes a module header and module data.

3. The method of claim 1 further comprising the step of passing the dynamic data frame through each of the plurality of sending modules without changing the dynamic data frame when the sending module determines it is not a participant in the dynamic data frame.

4. The method of claim 1 wherein after the step of determining from the connection identifier whether the sending module at which the dynamic data packet is presently located is a participant in the dynamic data frame, the method further comprises the step of:
  determining whether the participant data is present in a buffer of the sending module; and
  determining whether the sending module is ready to add the participant data to the dynamic data frame, wherein
  the sending module adds the participant data to the dynamic data frame via the aggregation unit when the participant data is present in the buffer and the sending module is ready to add the participant data, and
  the sending module passes the dynamic data frame through the sending module without changing the dynamic data frame when the participant data is not present in the buffer or the sending module is not ready to add the participant data.

5. The method of claim 1 wherein a first transmission path and a second transmission path exist between the first sending module and the receiving module, the method further comprising the steps of:
  detecting a fault along the first transmission path;
  assigning two new sending modules, selected from the plurality of sending modules, to begin generating the dynamic data frame;
  transmitting the dynamic data frame to the receiving module from a first new sending module along a portion of the first transmission path located between the fault and the receiving module, wherein the first new sending module is located on a first side of the fault proximate to the receiving module; and
  transmitting the dynamic data frame to the receiving module from a second new sending module along a portion of the first transmission path located between the fault and the first sending module and then along the second transmission path, wherein the second new sending module is located on a second side of the fault distal from the receiving module.

6. The method of claim 1 wherein the aggregation unit is arranged between a physical layer and a network link layer of each sending module.

7. The method of claim 1 wherein the dynamic data frame is initially an empty data frame including the header and a checksum.

8. The method of claim 7 further comprising the steps of:
  determining a new checksum for the dynamic data frame in each aggregation unit after adding the participant data;
  replacing the checksum on the dynamic data frame with the new checksum.

9. A module for communicating a dynamic data frame on an industrial network, the module comprising:
  a first port operable to receive the dynamic data frame from the industrial network, wherein:
    the dynamic data frame includes a header having a destination address and a connection identifier,
    the destination address corresponds to a receiving module for which the dynamic data frame is intended, and
    the connection identifier corresponds to the dynamic data frame;
  a second port operable to transmit the dynamic data frame on the industrial network; and
  an aggregation unit in communication with the first port and the second port, wherein the aggregation unit is operable to:
    receive the dynamic data frame from the first port,
    read the connection identifier from the dynamic data frame,
    determine from the connection identifier whether the module is a participant module for the dynamic data frame,
    add participant data to the dynamic data frame when the module is a participant module, wherein the added participant data increases a length of the dynamic data frame, and
    transmit the dynamic data frame with the added participant data via the second port.

10. The module of claim 9 further comprising a seeding unit in communication with the aggregation unit, wherein the seeding unit generates the dynamic data frame.

11. The module of claim 9 wherein:
  each of the first port and the second port define, at least in part, a physical layer of the module,
  the module further comprises a network link layer, and
  the aggregation unit is connected in series between the physical layer and the network link layer.

12. The module of claim 9 further comprising:
  a buffer operable to store the participant data prior to insertion in the dynamic data frame; and
  a processor operable to load the participant data in the buffer and to provide a signal to the aggregation unit that the participant data is available in the buffer.

13. The module of claim 12 wherein the aggregation unit is further operable to:
  read the signal corresponding to participant data being available in the buffer;

add the participant data to the dynamic data frame when the module is a participant module and when participant data is available in the buffer; and transmit an unmodified dynamic data frame via the second port when the module is a participant module and when participant data is not available in the buffer.

14. The module of claim 9 wherein:

the dynamic data frame is initially an empty data frame including the proprietary header and a checksum, and the aggregation unit is further operable to increase a length of the dynamic data frame by inserting the participant data to the dynamic data frame.

15. The module of claim 14 wherein the aggregation unit is further operable to:

determine a new checksum for the dynamic data frame after adding the participant data, and replace the checksum on the dynamic data frame with the new checksum.

16. A system for reducing network traffic on an industrial network, the system comprising:

a plurality of sending modules, each sending module including:

a first port operable to receive the dynamic data frame from the industrial network, wherein the dynamic date frame includes a header having a destination address and a connection identifier, the destination address corresponds to a receiving module for which the dynamic data frame is intended, and the connection identifier corresponds to the dynamic data frame;

a second port operable to transmit the dynamic data frame on the industrial network; and an aggregation unit in communication with the first port and the second port, wherein the aggregation unit is operable to:

receive the dynamic data frame from the first port, read the connection identifier from the dynamic data frame, determine from the connection identifier whether the module is a participant module for the dynamic data frame, add participant data to the dynamic data frame when the module is a participant module, wherein the added participant data increases a length of the dynamic data frame, and transmit the dynamic data frame with the added participant data via the second port; and a receiving module including:

a port in communication with the industrial network to receive the dynamic data frame from one of the plurality of sending modules; and a processor operable to extract the participant data for each of the plurality of sending modules from the dynamic data frame.

17. The system of claim 16 wherein:

the participant data includes a module header and module data, the module header identifies the sending module adding the module data, and the receiving module reads each module header to identify the sending module which added the module data.

18. The system of claim 16 wherein each of the sending modules further includes a seeding unit in communication with the aggregation unit, wherein the seeding unit in a first sending module generates an empty dynamic data frame and transmits the empty dynamic data frame to the aggregation unit for the first sending module.

19. The system of claim 18 wherein:

a first transmission path and a second transmission path exist between the first sending module and the receiving module, each sending module further includes a processor, at least one of the processor and the aggregation unit in at least one sending module is operable to detect a fault along the first transmission path, the seeding unit in a first new sending module, located on a first side of the fault proximate to the receiving module, generates the dynamic data frame for transmission to the receiving module along a portion of the first transmission path located between the fault and the receiving module, and the seeding unit in a second new sending module, located on a second side of the fault distal from the receiving module, generates the dynamic data frame for transmission to the receiving module along a portion of the first transmission path located between the fault and the first sending module and then along the second transmission path.

20. The system of claim 19 wherein the receiving module is operable to extract the participant data from the dynamic data frame generated by both the first new sending module and the second new sending module.

* * * * *

UNITED STATES PATENT AND TRADEMARK OFFICE
CERTIFICATE OF CORRECTION

PATENT NO. : 9,960,997 B2
APPLICATION NO. : 15/084661
DATED : May 1, 2018
INVENTOR(S) : Balasubramanian et al.

It is certified that error appears in the above-identified patent and that said Letters Patent is hereby corrected as shown below:

In the Specification

IN THE BRIEF DESCRIPTION OF THE INVENTION

Column 3, Line 54    Replace "date" with "data".

IN THE DETAILED DESCRIPTION

Column 12, Line 61    Replace "liar" with "for".

In the Claims

Claim 1
Column 15, Line 16    Replace "identifier," with "identifier".

Claim 16
Column 17, Line 25    Replace "date" with "data".

Signed and Sealed this
Seventeenth Day of July, 2018

Andrei Iancu
*Director of the United States Patent and Trademark Office*